United States Patent
Cunningham et al.

(10) Patent No.: US 7,232,193 B2
(45) Date of Patent: Jun. 19, 2007

(54) LOCKING MECHANISM FOR SECURING THE BEZEL OF AN ELECTRONICS ENCLOSURE TO A RACK STRUCTURE

(75) Inventors: W. Brian Cunningham, Westborough, MA (US); C. Ilhan Gundogan, Lexington, MA (US); Lawrence J. Feroli, W. Townsend, MA (US); Gerald J. Cote, Westborough, MA (US); Steven Cieluch, Allston, MA (US)

(73) Assignee: EMC Corporation, Hopkinton, MA (US)

( * ) Notice: Subject to any disclaimer, the term of this patent is extended or adjusted under 35 U.S.C. 154(b) by 130 days.

(21) Appl. No.: 10/852,897

(22) Filed: May 25, 2004

(65) Prior Publication Data

US 2005/0264142 A1 Dec. 1, 2005

(51) Int. Cl.
*A47B 47/00* (2006.01)
(52) U.S. Cl. ............................... 312/265.5; 312/223.2
(58) Field of Classification Search ............... 312/215, 312/222, 257.1, 265.5, 265.6, 223.1, 223.2; 361/683, 724, 725
See application file for complete search history.

(56) References Cited

U.S. PATENT DOCUMENTS

| | | | |
|---|---|---|---|
| 4,999,459 A | 3/1991 | Smith et al. | |
| 5,365,285 A | 11/1994 | Kizuya et al. | |
| 5,825,626 A * | 10/1998 | Hulick et al. | 361/724 |
| 5,997,115 A * | 12/1999 | Radloff et al. | 312/222 |
| 6,209,975 B1 * | 4/2001 | Lai | 312/223.2 |
| 6,239,359 B1 | 5/2001 | Lilienthal et al. | |
| 6,356,436 B1 * | 3/2002 | Buican et al. | 361/683 |
| 6,515,871 B1 | 2/2003 | Stark et al. | |
| 6,544,047 B2 | 4/2003 | Moore | |
| 6,563,042 B2 | 5/2003 | Barabash | |
| 6,608,251 B1 | 8/2003 | Nurmi | |
| 6,899,407 B1 * | 5/2005 | Lai | 312/223.2 |
| 2001/0003406 A1 | 6/2001 | Bertolami | |
| 2002/0017838 A1 | 2/2002 | Roesner et al. | |
| 2002/0064349 A1 | 5/2002 | Ngo et al. | |
| 2003/0227239 A1 * | 12/2003 | Wang et al. | 312/257.1 |

* cited by examiner

*Primary Examiner*—James O. Hansen
(74) *Attorney, Agent, or Firm*—Guerin & Rodriguez, LLP; Michael A. Rodriguez

(57) ABSTRACT

Described is a bezel for an electronics enclosure. The bezel frame includes a frame, first and second plunger mechanisms, a shuttle, and a locking mechanism. The locking mechanism has a cam disposed in a path of lateral movement of the first plunger mechanism. The cam is located between that plunger mechanism and a tab of the shuttle. The orientation of the cam determines the extent of lateral movement of the plunger mechanisms. In one orientation, the cam restricts the lateral movement of the first plunger mechanism and urges the shuttle into a position that restricts the lateral movement of the second plunger mechanism. Consequently, neither plunger mechanism is able to move far enough laterally to disengage from a mounting structure.

19 Claims, 10 Drawing Sheets

LOCKING MECHANISM FOR SECURING THE BEZEL OF AN ELECTRONICS ENCLOSURE TO A RACK STRUCTURE

FIELD OF THE INVENTION

The invention relates generally to bezels for electronics enclosures. More particularly, the invention relates to a locking mechanism for securing bezels of an electronics enclosure to a rack or mounting structure.

BACKGROUND

Electronics equipment is often mounted in racks or other such structures. Bezels attached to the mounting structures protect the front-facing portion of the equipment and allow technical personnel access to the equipment for maintenance and repair. Typically, the mounting structure includes vertical rails with latches to which the bezel is mounted. Latches of the bezel attach to the latches on the vertical rails.

A locking mechanism, often located midway along the length of the bezel, is often used to prevent unauthorized removal of the bezel from the rails. When locked, the locking mechanism prevents personnel from operating the bezel latches to release the electronics equipment from the rail latches.

Equipment manufacturers often include a badge or identity plate having the manufacturer's name or logo on the front side of the bezel. Sometimes the badge is located near the middle of the bezel. The location of the locking mechanism, if located near the center of the bezel, can interfere with this desired presentation of the badge. Consequently, if the badge is to remain centrally located, the location of the locking mechanism should be displaced to one side of the bezel. The displacement of the locking mechanism, however, can pose a difficulty in ensuring that the latch mechanisms on opposite sides of the bezel can be locked. Thus there remains a need for a bezel that includes a locking mechanism displaced from the front center of the bezel and can limit operation of both latch mechanisms when the bezel is locked. The present invention satisfies this need and provides additional advantages.

SUMMARY

In one aspect, the invention features a bezel for an electronics enclosure. The bezel includes a bezel frame. A first plunger mechanism and a second plunger mechanism are moveably attached at opposite ends of the bezel frame for lateral movement between a latched position in which that plunger mechanism can engage a respective latch on an electronics enclosure and an unlatched position in which that plunger mechanism can be disengaged from the respective latch. A shuttle has a first tab and a second tab connected at opposite ends of an elongated member. The shuttle is moveably attached to the bezel frame such that each tab is near a respective one of the first and second plunger mechanisms.

A locking mechanism has a cam disposed in a path of the lateral movement of the first plunger mechanism between the first plunger mechanism and the first tab of the shuttle. The cam has a first orientation when the locking mechanism is in an unlocked state and a second orientation when the locking mechanism is in a locked state. The first orientation allows sufficient lateral movement of each plunger mechanism for that plunger mechanism to attain the unlatched position. The second orientation causes the cam to contact the first tab of the shuttle and urge the shuttle laterally towards the second plunger mechanism so that the second tab restricts the lateral movement of the second plunger mechanism to keep the second plunger mechanism in the latched position while the cam restricts the lateral movement of the first plunger mechanism to keep the first plunger mechanism in the latched position.

In another aspect, the invention features a bezel for an electronics enclosure. The bezel comprises a bezel frame, a first plunger mechanism and a second plunger mechanism moveably attached at opposite ends of the bezel frame for latching and unlatching the bezel, a shuttle having an elongated member extending along a length of the bezel frame, and a locking mechanism having a cam located between the first plunger mechanism and a first part of the shuttle. The cam has an orientation that restricts lateral movement of the first plunger mechanism and urges a second part of the shuttle into a position that restricts the lateral movement of the second plunger mechanism.

In still another aspect, the invention features a data storage enclosure comprising a bezel attached to a mounting structure. The bezel includes a bezel frame, a first plunger mechanism and a second plunger mechanism moveably attached at opposite ends of the bezel frame for latching the bezel to and unlatching the bezel from the mounting structure, a shuttle having an elongated member extending along a length of the bezel frame, and a locking mechanism having a cam located between the first plunger mechanism and a first part of the shuttle. The cam has an orientation that restricts lateral movement of the first plunger mechanism and urges a second part of the shuttle into a position that restricts the lateral movement of the second plunger mechanism.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention features a bezel for an electronics enclosure 140 (FIG. 8), such as a data storage enclosure. At opposite ends of the bezel are plunger mechanisms for attaching the bezel to an equipment mounting structure. A single locking mechanism prevents personnel from operating the plunger mechanisms to remove the bezel from the mounting structure. The locking mechanism, however, does not prevent the bezel from being attached to the mounting structure when locked. The locking mechanism of the invention is offset from the middle of the bezel to prevent interference with a manufacturer's badge and the general aesthetic presentation of the equipment.

Figure 1:
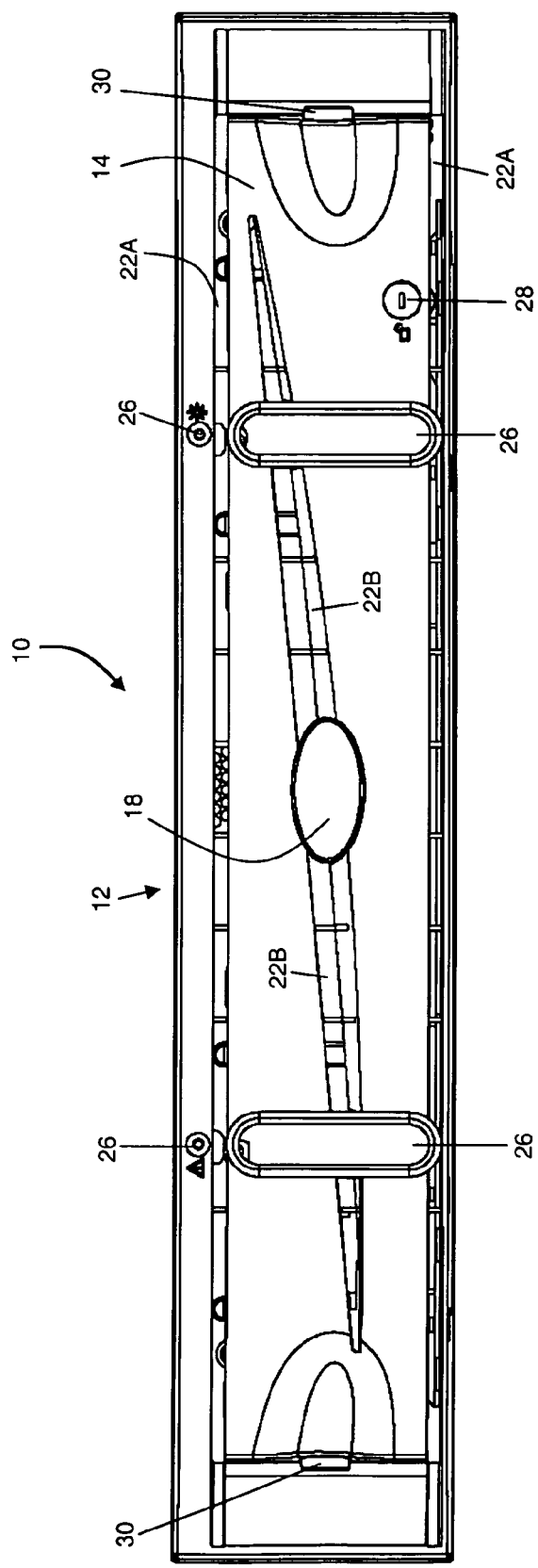
FIG. 1 is a front view of an embodiment of a bezel constructed in accordance with the principles of the invention.

FIG. 1 illustrates a front side of a bezel 10, constructed in accordance with the principles of the invention. The front side of the bezel 10, also called a front panel or faceplate, faces away from the components within the electronics enclosure and is visible to personnel in the vicinity of the enclosure. The other (rear) side of the bezel 10 faces the internal components of the electronics enclosure and is described below in connection with FIG. 2. The bezel 10 includes a bezel frame 12 of a generally rectangular shape. The bezel frame 12 has an outer surface 14 curved about a vertical axis behind the plane of the page. The bezel frame 12 is made, for example, by molding plastic material into the illustrated shape.

The outer surface 14 includes a badge 18 that can include any variety of information including, for example, the manufacturer's name, the product name or a logo. Airflow openings 22 in the outer surface 14 provide a means to draw a cooling airflow through the bezel frame 12 and into the electronics enclosure. The airflow openings 22 include two horizontal openings 22A and distinctive sloped openings 22B. Additional openings 26 accept light pipes which conduct light from status lights, such as emitting diodes (LEDs), mounted inside the electronics enclosure. Other embodiments have fewer or more airflow openings 22 and light pipe openings 26 than those shown. In other embodiments, the size, position and orientation of the openings 22, 26 in the bezel frame 12 are different.

A key port 28 of a locking mechanism of the invention is provided along the outer surface 14 to accept a key for locking or unlocking the bezel 10 from the mounting structure, as described herein. A pair of buttons 30 protrudes horizontally through openings in the curved outer surface 14 of the bezel frame 12. Personnel depress both buttons 30 to remove the bezel 10 from the equipment mounting structure. The buttons 30 do not need to be depressed to mount the bezel 10.

Figure 2:
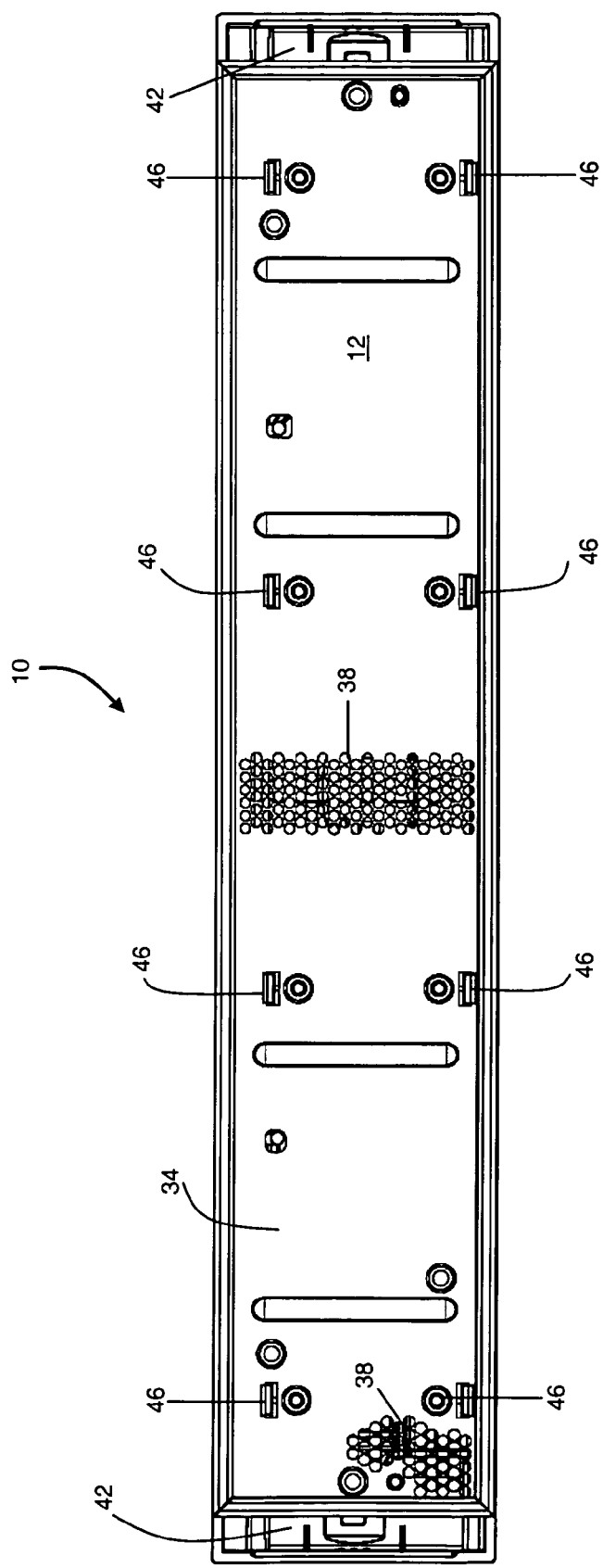
FIG. 2 is a back view of the bezel of FIG. 1 with an attached EMI shield.

FIG. 2 illustrates a back view of the bezel frame 12 with an attached EMI shield 34. The EMI shield 34 is fabricated from an electrically conductive material and has a honeycomb array of openings 38 sized to pass the cooling airflow and to prevent EMI leakage. The openings 38 extend across the rectangular shape of the EMI shield 34 but are only shown in two regions for clarity. A plurality of snaps arranged in two rows extends from a back surface 42 of the bezel 10. Each snap includes a stem attached at one end to the back surface 42 and a hook 46 at the other end of the stem. A spring (not shown) is disposed near each stem to apply a compressive force between the bezel frame 12 and the EMI shield 34. The height of each stem is such that the hook 46 extends through a respective opening in the EMI shield 34. The hooks 46 operate in conjunction with the springs to secure the EMI shield 34 to the bezel frame 12. A resilient EMI gasket 50 made of electrically conductive material is affixed to the periphery of the EMI shield 34. The EMI gasket "fills" any gap between the EMI shield 34 and the electronics enclosure when the bezel 10 is latched to the equipment mounting structure.

Figure 3A:
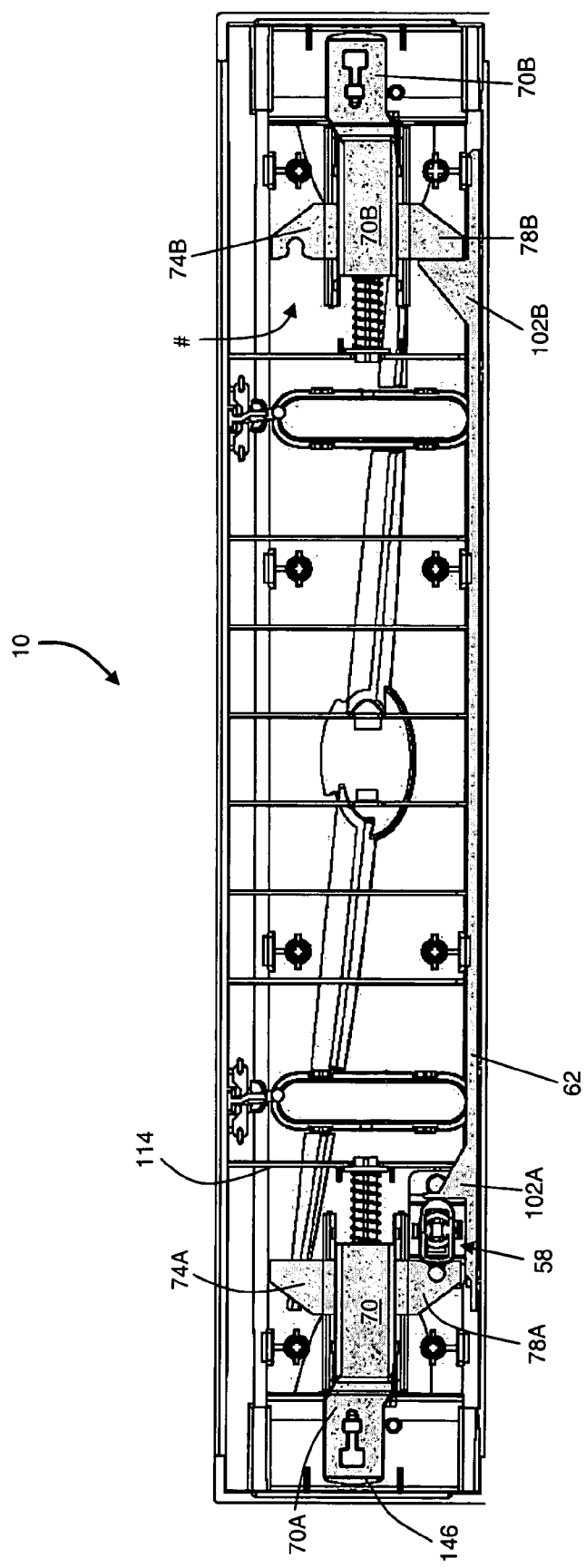
FIG. 3A is a back view of the bezel of FIG. 2 without the EMI shield.
Figure 3B:
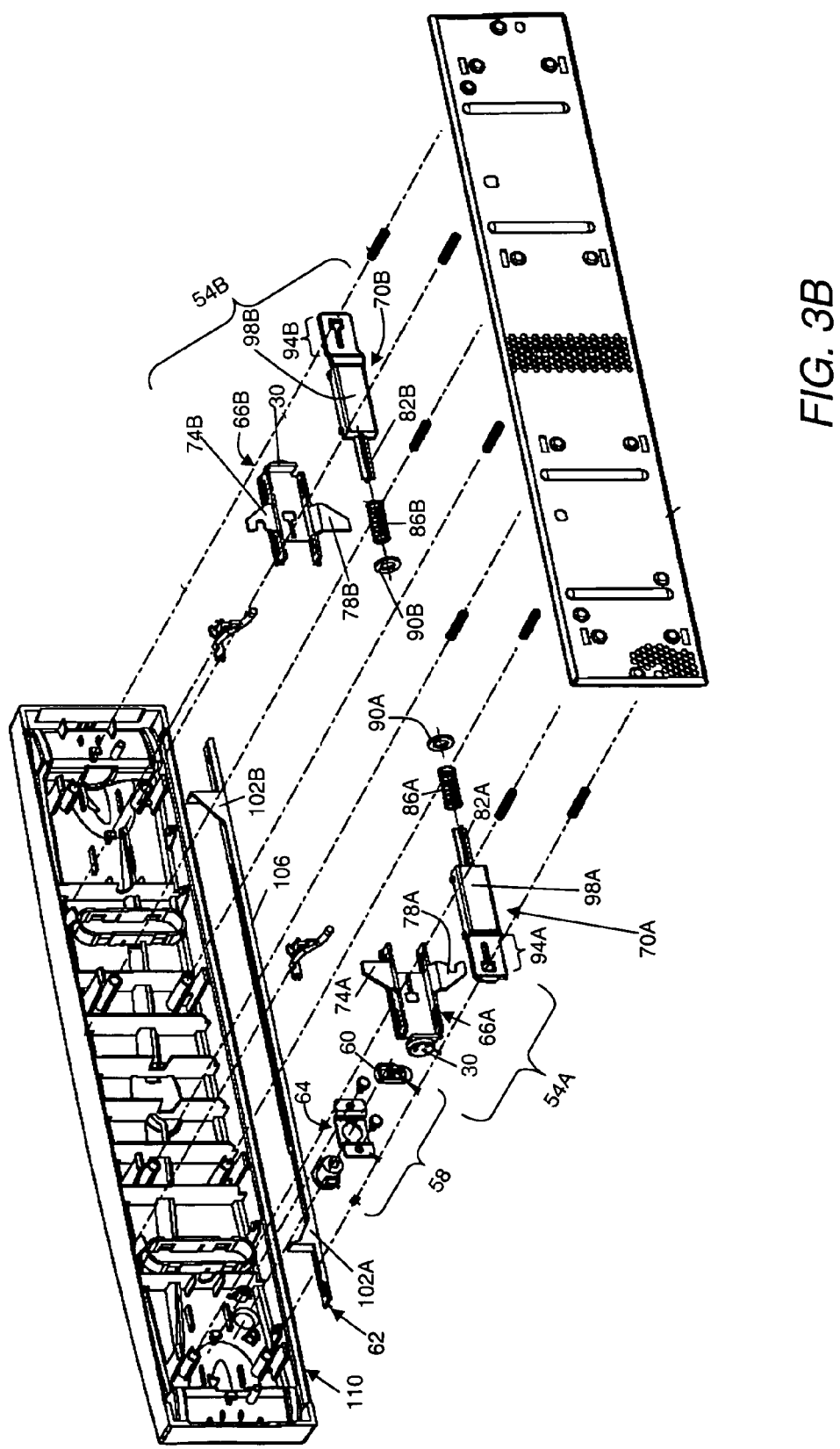
FIG. 3B is an exploded back view of the bezel of FIG. 3A.

Referring to FIG. 3A and FIG. 3B, FIG. 3A is a back view of the bezel 10 unobstructed by the EMI shield 34, and FIG. 3B is an exploded view of the bezel 10 showing the EMI shield 34 relative to the bezel components. The bezel 10 includes a left plunger mechanism 54A and a right plunger mechanism 54B (generally 54), a locking mechanism 58 and a shuttle 62. As used herein, relative terms such as left, right, top, bottom, horizontal, and vertical, are arbitrary, chosen for the purpose of clearly describing the invention, and not intended to limit the operation of the bezel 10 to any particular position or orientation.

Each plunger mechanism 54A, 54B includes, respectively, a button portion 66A, 66B and a latch portion 70A, 70B. Each button portion 66A, 66B includes the button 30 that extends through the curved outer surface 14 of the bezel frame 12, an upper tab 74A, 74B, and a lower tab 78A, 78B. Each latch portion 70A, 70B includes a post 82A, 82B supporting a spring coil 86A, 86B and washer 90A, 90B, and a lip 94A, 94B extending from a latch body 98A, 98B.

The shuttle 62 includes a left tab 102A and a right tab 102B near the ends of an elongated member 106. The shuttle 62 is attached along a bottom edge 110 of the bezel frame 12 and is moveable along the bottom edge 110 as described below. The locking mechanism 58 is attached to the back surface 42 of the bezel frame 12 as described below and includes a cam 60 (i.e., pawl) disposed between the lower tab 78A of the left plunger mechanism 54A and the left tab 102A of the shuttle 62. The locking mechanism 58 extends through the bezel frame 12 such that personnel can operate the lock using a key from the front side of the bezel 10. The locking mechanism 58 can be maintained in an unlocked state, allowing the plunger mechanisms 54 and shuttle 62 to move laterally. Conversely, the locking mechanism 58 can be locked such that movement of the plunger mechanisms 58 is restricted.

Figure 4:
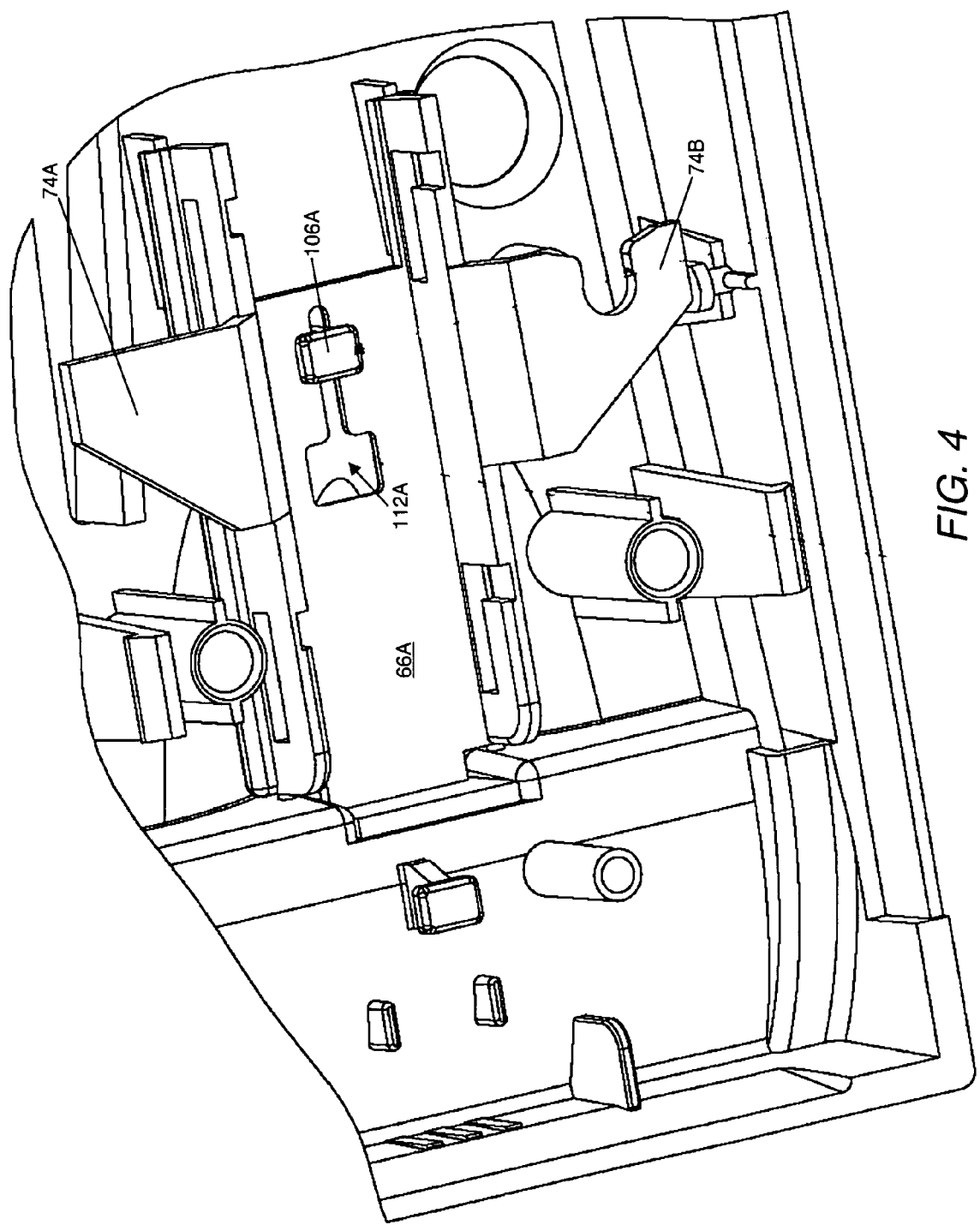
FIG. 4 is a detailed view of the button portion of the left plunger mechanism according to an embodiment of the present invention.
Figure 5:
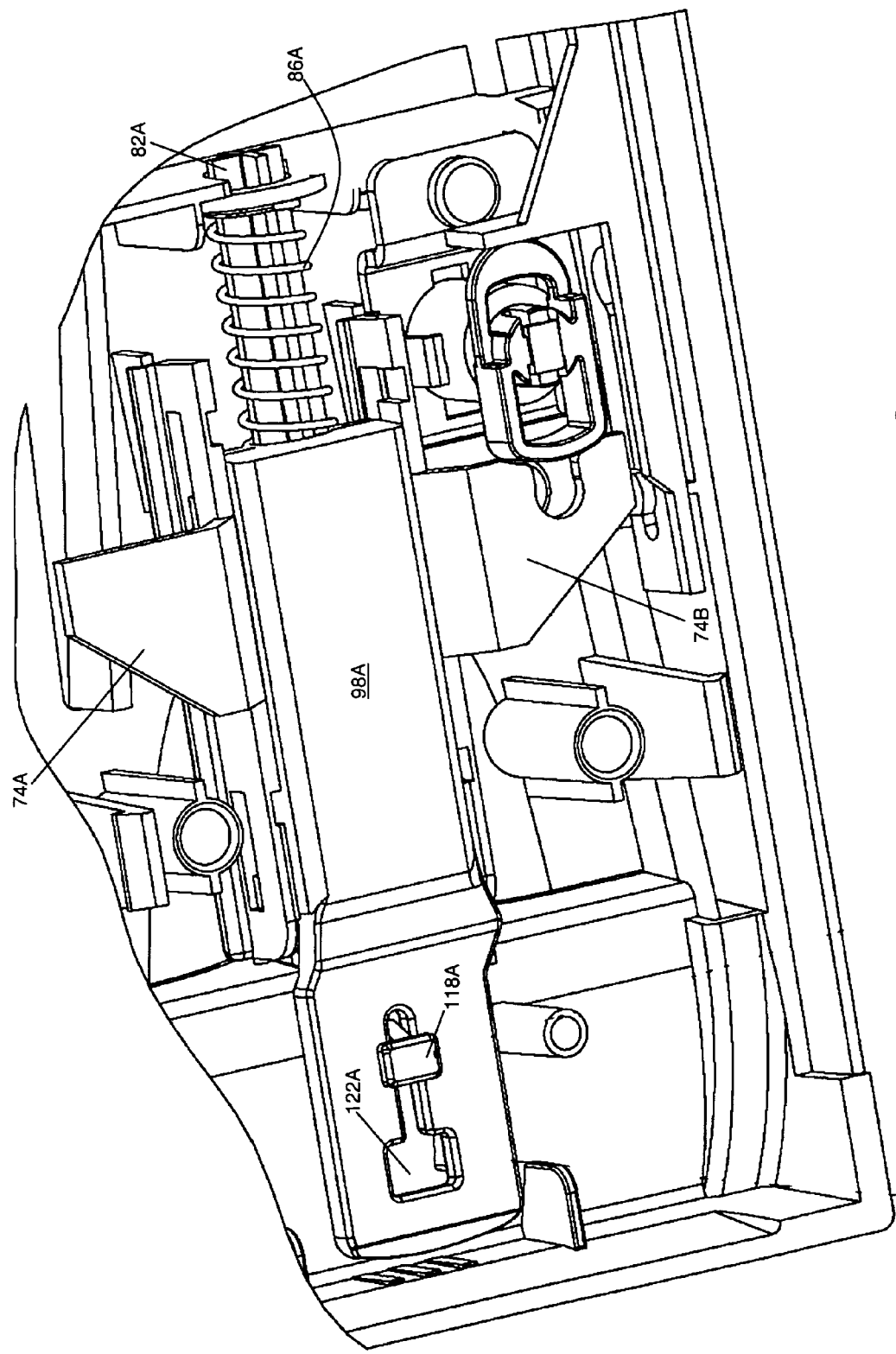
FIG. 5 is a detailed view of the latch and button portions of the left plunger mechanism according to an embodiment of the invention.

FIG. 4 shows an embodiment of the button portion 66A of the plunger mechanism 54A. A keyhole opening 112A accepts a pedestal extending from the back surface 42 of the bezel frame 12. The pedestal includes a stem portion (not shown) and a rectangular shaped top portion 106A which captures the button portion 66A when disposed in the slot of the opening 112A. FIG. 5 shows an embodiment of the latch portion 70A of the plunger mechanism 54A. The post 86A is inserted through an opening in a rib 114 (see FIG. 3A) and the spring coil 86A is compressed to permit the latch portion 70A to engage the button portion 66A, and to allow a pedestal 118A to extend through the broad end of a keyhole opening 122A in the lip 94A. The slotted portions of the keyhole openings 112A, 122A constrain the plunger mechanism 54A to move only horizontally. Advantageously, assembly of the plunger mechanisms 54 requires no separate fasteners (e.g., screws) or tools, and assembly time is reduced.

Figure 6:
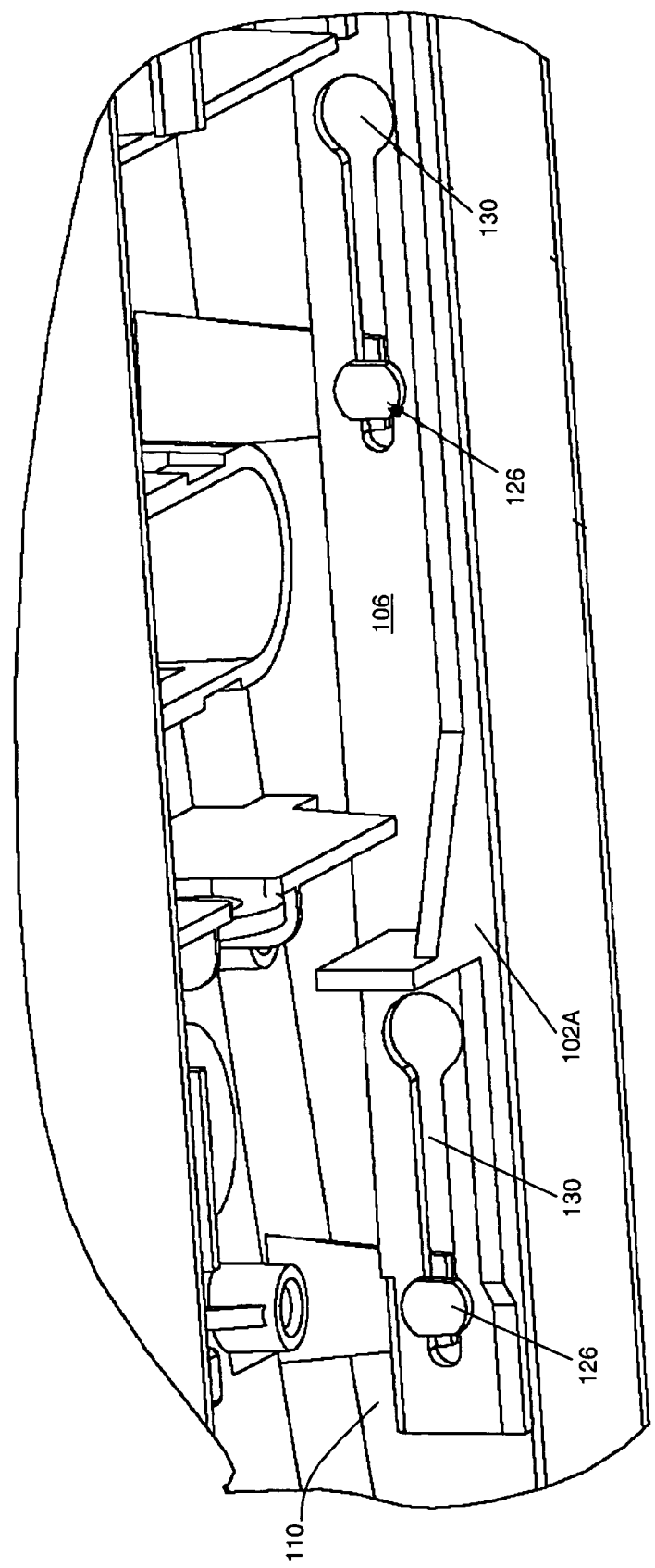
FIG. 6 is a detailed view of a portion of the shuttle according to an embodiment of the invention.

FIG. 6 is a back view of a portion of the bezel frame 12 illustrating the attachment of the shuttle 62. The shuttle 62 is positioned over the bottom edge of the bezel frame 12 so that four pedestals 126 (only two shown) are directly beneath the broad end of four keyhole openings 130 (only two shown) in the elongated member 106 of the shuttle 62. The shuttle 62 is then lowered onto the bottom edge 110 and moved laterally so that the pedestals 126 capture the shuttle 62. Motion of the shuttle 62 is thereby restricted to a limited length of the slotted portion of the keyhole openings 130.

Figure 7A:
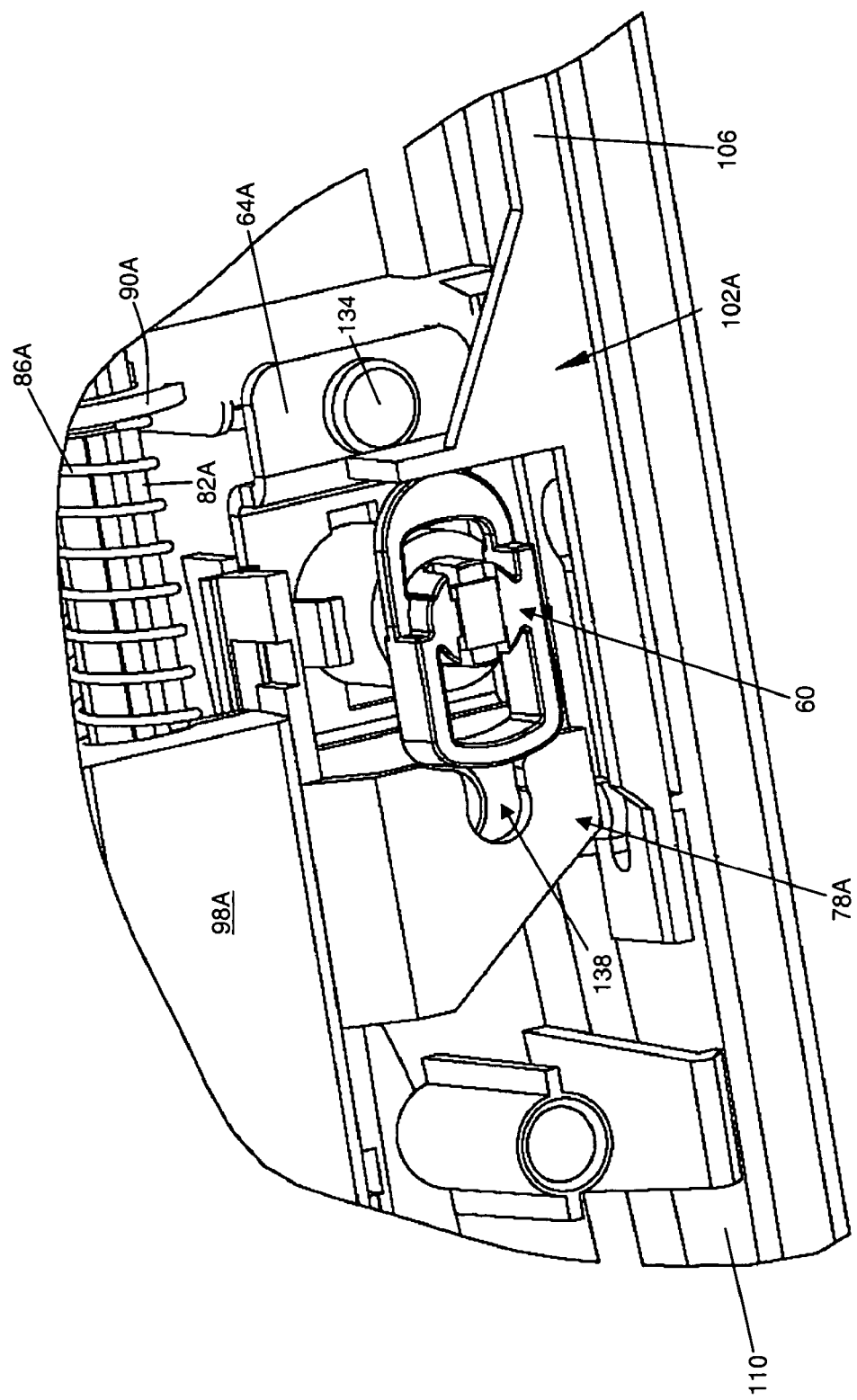
FIG. 7A is a detailed view of a portion of the bezel in an unlocked configuration according to an embodiment of the invention.

FIG. 7A illustrates the locking mechanism 58 in more detail. The locking mechanism 58 includes the cam 60 and a mounting plate 64 (see FIG. 3B) with two openings (not shown) to receive attachment screws 134. A cutout 138 in the lower tab 78A of the plunger mechanism 54A allows a tool (e.g., screwdriver) to access one of the attachment screws 134.

FIG. 7A also shows the bezel 10 of the invention in a locked state. When the locking mechanism 58 becomes locked, the cam 60 rotates into a horizontal orientation. When rotated into the horizontal orientation, the cam 60 wedges between the lower tab 78A of the left plunger mechanism 54A and the left tab 102A, causing the shuttle 62 to move laterally towards the right plunger mechanism 54B. Consequently, the right tab 102B of the shuttle 62 moves close to or comes into contact with the lower tab 78B of the right plunger mechanism 54B.

The location of the right tab 102B operates to restrict any leftward movement of the right plunger mechanism 54B. If a user depresses the button 30 of the right plunger mechanism 54B, the lower tab 78B immediately contacts the right tab 102B of the shuttle 62 and attempts to move the shuttle 62 towards the left. The shuttle 62 cannot move much to the left, however, because the left tab 102A presses against the cam 60. As a result, the right plunger mechanism 54B does not move far enough to the left to disengage from the latch 142B (FIG. 8) on the mounting structure. Also, because the cam 60 is disposed in the path of movement of the left plunger mechanism 54A, between the lower tab 78A and the left tab 102 A of the shuttle 62, the horizontal orientation of the cam 60 restricts the possible range of lateral motion for the left plunger mechanism 54A. As a result, the left plunger mechanism 54A is unable to move far enough to the right to disengage from the corresponding latch 142A (FIG. 8) on the mounting structure.

Figure 8:
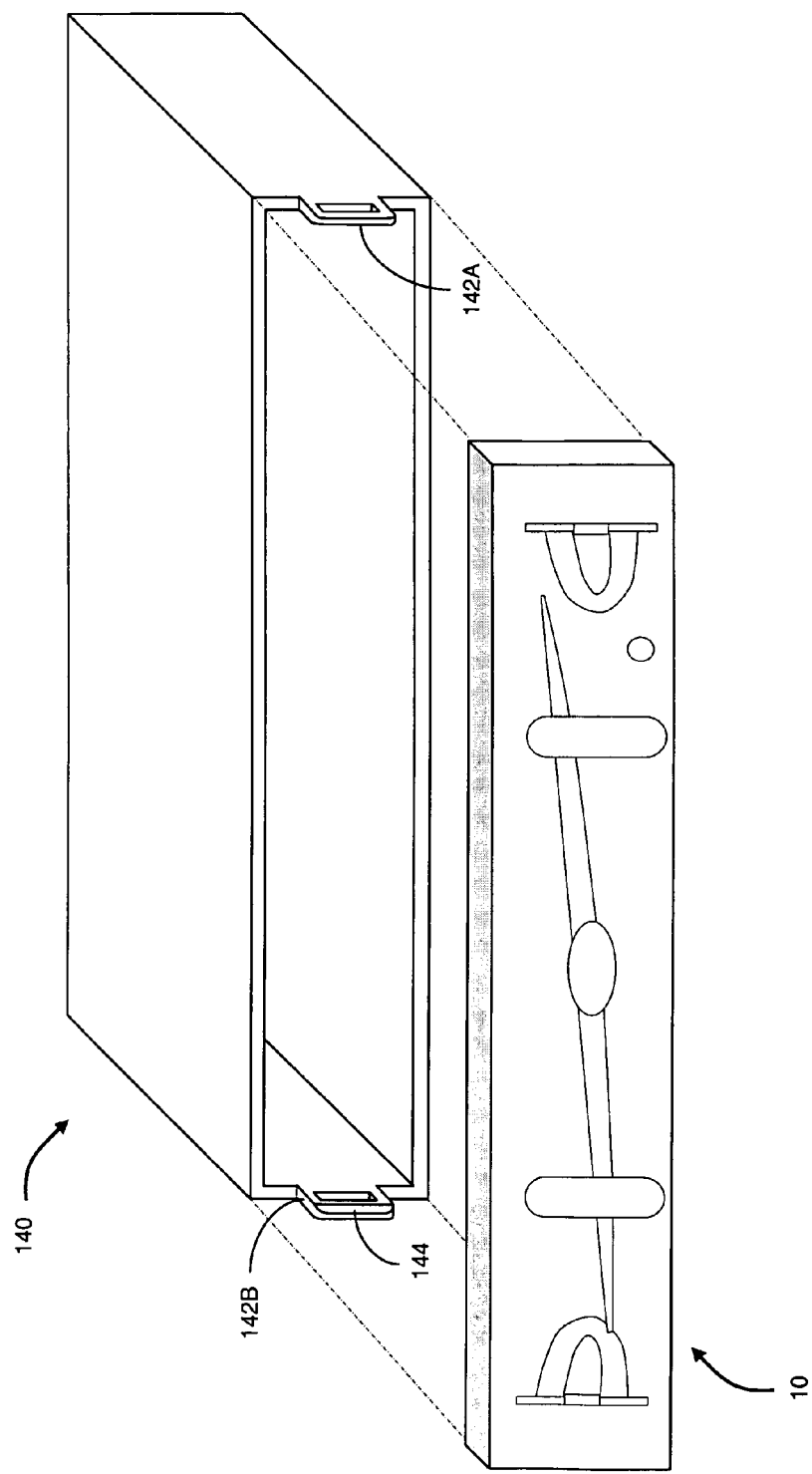
FIG. 8 is an exploded front view of an electronics enclosure with the bezel of FIG. 3A.

In one embodiment, referring to FIG. 8, a locked bezel 10 can still be attached to the latches 142A, 142B (generally 142) on a mounting structure. In this embodiment, the edge 146 (FIG. 3) at one end of each latch portion 70 opposite the post 82 is beveled (e.g., at approximately a 45 degree angle). Typically, the latches 142 of the mounting structure have a leading edge 144 that is also beveled (at an angle complementary to the end of angle of the latch portion 70). As the bezel 10 is moved towards the mounting structure, the beveled edge 144 contacts the beveled latches 142 on the mounting structure. Urging the bezel 10 further results in a small lateral movement of the plunger mechanisms 54 as the mounting latches 142 push against and wedge behind the beveled edges 144. The plunger mechanisms 54 snap back into position after the lips 94 pass by the latches 142 of the mounting structure, thereby securing the bezel 10 to the mounting structure (in a locked state).

Figure 7B:
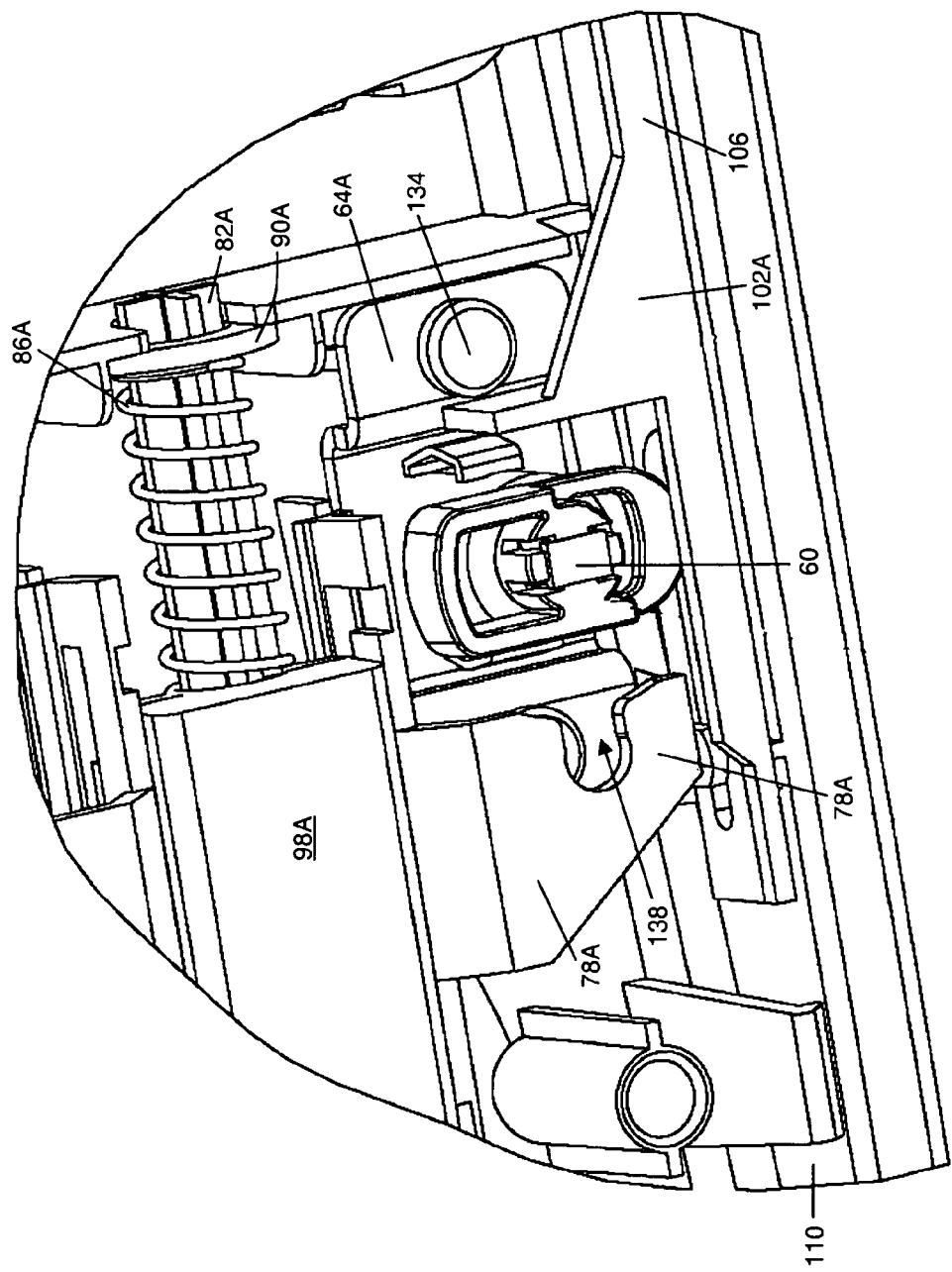
FIG. 7B is a detailed view of the portion of the bezel of FIG. 7A when in a locked configuration.

FIG. 7B shows the bezel 10 of the invention in an unlocked state. When unlocked, the cam 60 is vertically oriented. This vertical orientation permits the left plunger mechanism 54A to move far enough to the right, when its button 30 is depressed, to disengage from the corresponding latch on the mounting structure. In addition, the vertical orientation permits the shuttle 62 lateral movement towards the left. As a result, the right plunger mechanism 54B can move far enough to the left, when its button 30 is depressed, to disengage from its respective latch on the mounting structure. Accordingly, the ability to fully depress the buttons 30 allows the bezel 10 to be removed from the mounting structure.

While the invention has been shown and described with reference to specific preferred embodiments, it should be understood by those skilled in the art that various changes in form and detail may be made therein without departing from the spirit and scope of the invention as defined by the following claims.

The invention claimed is:

1. A bezel for an electronics enclosure, the bezel comprising:
   a bezel frame;
   a first plunger mechanism and a second plunger mechanism moveably attached at opposite ends of the bezel frame for lateral movement between a latched position in which each plunger mechanism can engage a respective latch on an electronics enclosure and an unlatched position in which each plunger mechanism can be disengaged from the respective latch;
   a shuttle having a first tab and a second tab connected at opposite ends of an elongated member, the shuttle being moveably attached to the bezel frame such that each tab is near a respective one of the first and second plunger mechanisms; and
   a locking mechanism having a cam disposed in a path of the lateral movement of the first plunger mechanism between the first plunger mechanism and the first tab of the shuttle, the cam having a first orientation when the locking mechanism is in an unlocked state and a second orientation when the locking mechanism is in a locked state, the first orientation allowing sufficient lateral movement of each plunger mechanism for each plunger mechanism to attain the unlatched position, the second orientation causing the cam to contact the first tab of the shuttle and urge the shuttle laterally towards the second plunger mechanism so that the second tab restricts the lateral movement of the second plunger mechanism to keep the second plunger mechanism in the latched position while the cam restricts the lateral movement of the first plunger mechanism to keep the first plunger mechanism in the latched position.

2. The bezel of claim 1 wherein the first plunger mechanism comprises a tab to contact the cam of the locking mechanism when the first plunger mechanism is activated and the locking mechanism is in a locked state.

3. The bezel of claim 1 wherein the second plunger mechanism comprises a tab to contact the second tab of the shuttle when the second plunger mechanism is activated and the locking mechanism is in a locked state.

4. The bezel of claim 1 wherein each plunger mechanism comprises a button portion and a latch portion.

5. The bezel of claim 1 wherein the bezel frame comprises a plurality of ribs and wherein each plunger mechanism comprises a lip to engage a mounting latch and a compressive element in contact with one of the ribs, the compressive element urging the lip to an engaged position.

6. The bezel of claim 1, wherein the locking mechanism includes a lock with a keyhole for receiving a key, the keyhole of the lock being accessible from a front side of the bezel frame through an opening in the bezel frame, a back end of the lock being coupled to the cam, the cam rotating between the first and second orientations when the key is turned in the lock.

7. The bezel of claim 6, wherein the lock is disposed off-center in the bezel frame.

8. A bezel for an electronics enclosure, the bezel comprising:
   a bezel frame;
   a first plunger mechanism and a second plunger mechanism slidably attached to the bezel frame at opposite ends of the bezel frame for latching and unlatching the bezel to and from the electronics enclosure;

a shuttle having an elongated member extending along a length of the bezel frame; and a locking mechanism having a cam disposed between the first plunger mechanism and a first part of the shuttle, the cam having a locked orientation in which one side of the cam is urged against the first plunger mechanism while an opposite side of the cam is urged against the first part of the shuttle, wherein when the cam is in the locked orientation, the cam restricts sliding movement of the first plunger mechanism and urges a second part of the shuttle into a position against the second plunger mechanism that restricts the sliding movement of the second plunger mechanism.

9. The bezel of claim 8 wherein the first plunger mechanism comprises a tab to contact the cam of the locking mechanism when the cam is in the locked orientation.

10. The bezel of claim 8 wherein the second plunger mechanism comprises a tab to contact the second part of the shuttle when the cam is in the locked orientation.

11. The bezel of claim 8 wherein each plunger mechanism comprises a button portion and a latch portion.

12. The bezel of claim 8 wherein the bezel frame comprises a plurality of ribs and wherein each plunger mechanism comprises a lip to engage a mounting latch and a compressive element in contact with one of the ribs, the compressive element urging the lip to an engaged position.

13. The bezel of claim 8, wherein the locking mechanism includes a lock with a keyhole for receiving a key, the keyhole of the lock being accessible from a front side of the bezel frame through an opening in the bezel frame, a back end of the lock being coupled to the cam, the cam rotating into the locked orientation in accordance with the key being turned in the lock.

14. The bezel of claim 13, wherein the lock is disposed off-center in the bezel frame.

15. A bezel comprising:

a frame having a front panel with an exterior surface and an interior surface;

a first plunger mechanism and a second plunger mechanism slidably attached to the interior surface of the frame at opposite ends of the frame;

a shuttle slidably coupled to the frame, the shuttle having an elongated member extending along a length of the frame, the shuttle having a first tab at one end of the elongate member and a second tab at the opposite end of the elongate member and opposing the first tab; and a locking mechanism having a rotatable cam disposed between the first plunger mechanism and the first tab of the shuttle in a path of sliding movement of the shuttle, the rotatable cam having a first orientation that leaves a gap between the cam and the first plunger mechanism and a second orientation that brings the cam into contact with the first plunger mechanism and with the first tab of the shuttle and urges the second tab of the shuttle against the second plunger mechanism, thereby restricting the sliding movement of the shuttle.

16. The bezel of claim 15, wherein the locking mechanism includes a lock with a keyhole for receiving a key, the keyhole of the lock being accessible from a front side of the frame through an opening in the front panel, a back end of the lock being coupled to the cam, the cam rotating between the first and second orientations when the key is turned in the lock.

17. The bezel of claim 16, wherein the lock is disposed off-center in the front panel of the frame.

18. The bezel of claim 15, wherein the interior surface of the frame has a plurality of snaps extending perpendicularly therefrom, each snap terminating at a hook, and further comprising an EMI (Electromagnetic Interference) shield having a plurality of openings, each opening receiving the hook of one of the snaps to secure the EMI shield to a back side of the frame.

19. The bezel of claim 15, wherein each plunger mechanism has a button member that may be pushed to cause sliding movement of the plunger member, and wherein the front panel of the frame has an opening at each end of the frame, each opening receiving the button member of a different one of the plunger mechanisms to provide access to the button member.

* * * * *